US008612532B2

(12) United States Patent
Bangalore et al.

(10) Patent No.: US 8,612,532 B2
(45) Date of Patent: *Dec. 17, 2013

(54) SYSTEM AND METHOD FOR OPTIMIZING RESPONSE HANDLING TIME AND CUSTOMER SATISFACTION SCORES

(71) Applicant: AT&T Intellectual Property I, L.P., Atlanta, GA (US)

(72) Inventors: Srinivas Bangalore, Morristown, NJ (US); Mazin Gilbert, Warren, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,929

(22) Filed: Nov. 30, 2012

(65) Prior Publication Data
US 2013/0097264 A1  Apr. 18, 2013

Related U.S. Application Data

(63) Continuation of application No. 13/539,896, filed on Jul. 2, 2012, now Pat. No. 8,359,364, and a continuation of application No. 12/019,821, filed on Jan. 25, 2008, now Pat. No. 8,214,441.

(51) Int. Cl.
  *G06F 15/16*  (2006.01)
(52) U.S. Cl.
  USPC ...... 709/206; 705/7.13; 705/7.14; 705/14.44; 705/14.1; 704/223; 704/251; 709/203; 709/223; 715/205
(58) Field of Classification Search
  None
  See application file for complete search history.

(56) References Cited

U.S. PATENT DOCUMENTS

| | | | | |
|---|---|---|---|---|
| 5,603,031 | A | * | 2/1997 | White et al. .................. 719/317 |
| 5,632,018 | A | * | 5/1997 | Otorii .......................... 709/200 |
| 5,764,899 | A | * | 6/1998 | Eggleston et al. ........... 709/203 |
| 6,085,201 | A | * | 7/2000 | Tso .............................. 715/205 |
| 6,343,311 | B1 | * | 1/2002 | Nishida et al. .............. 709/203 |
| 6,356,633 | B1 | * | 3/2002 | Armstrong ............. 379/265.11 |
| 6,816,885 | B1 | * | 11/2004 | Raghunandan .............. 709/206 |
| 6,832,244 | B1 | * | 12/2004 | Raghunandan .............. 709/206 |
| 7,069,302 | B2 | * | 6/2006 | Saito et al. .................... 709/206 |
| 7,587,678 | B1 | * | 9/2009 | English et al. ................ 715/752 |
| 7,818,219 | B2 | * | 10/2010 | Klivington et al. ......... 705/26.1 |
| 2002/0032738 | A1 | * | 3/2002 | Foulger et al. ............... 709/206 |
| 2003/0105824 | A1 | * | 6/2003 | Brechner et al. ............. 709/206 |
| 2003/0187756 | A1 | * | 10/2003 | Klivington et al. ............ 705/27 |

(Continued)

OTHER PUBLICATIONS

Bigus, Joseph P., and Jennifer Bigus. "Constructing intelligent agents using Java." (2001).*

(Continued)

*Primary Examiner* — Gurkanwaljit Singh

(57) ABSTRACT

A system and method disclosed for using and updating a database of template responses for a live agent in response to user communications. The method includes computing an average string distance between each response from a live agent and a template, use to generate the response, modifying the computed average string distance based on a customer satisfaction score associated with each response and selecting a response that minimizes the computed average string distance and maximizes customer satisfaction. Upon receiving a further communication on a certain issue, the system presents a prototype response that has been added to the template database to the live agent for use in generating a response to the further communication that reduces handling time and increases customer satisfaction.

20 Claims, 3 Drawing Sheets

(56) References Cited

U.S. PATENT DOCUMENTS

| | | | | |
|---|---|---|---|---|
| 2004/0243925 | A1* | 12/2004 | Yates et al. | 715/500 |
| 2005/0036681 | A1* | 2/2005 | Lenoir | 382/176 |
| 2006/0054683 | A1* | 3/2006 | Michelsen et al. | 235/379 |
| 2006/0092861 | A1* | 5/2006 | Corday et al. | 370/256 |
| 2006/0143307 | A1* | 6/2006 | Codignotto | 709/246 |
| 2006/0149577 | A1* | 7/2006 | Stashluk et al. | 705/1 |
| 2006/0253537 | A1* | 11/2006 | Thomas | 709/206 |
| 2006/0259524 | A1* | 11/2006 | Horton | 707/201 |
| 2007/0002388 | A1* | 1/2007 | Henry et al. | 358/400 |
| 2007/0005762 | A1* | 1/2007 | Knox et al. | 709/224 |
| 2007/0038717 | A1* | 2/2007 | Burkholder et al. | 709/206 |
| 2007/0203784 | A1* | 8/2007 | Keller et al. | 705/10 |
| 2007/0229889 | A1* | 10/2007 | Henry et al. | 358/1.15 |
| 2007/0237314 | A1* | 10/2007 | Henry et al. | 379/100.08 |
| 2007/0260523 | A1* | 11/2007 | Schadt et al. | 705/14 |
| 2008/0098073 | A1* | 4/2008 | Coleman et al. | 709/206 |

OTHER PUBLICATIONS

Bellifemine, Fabio, Agostino Poggi, and Giovanni Rimassa. "Developing multi-agent systems with JADE." Intelligent Agents VII Agent Theories Architectures and Languages. Springer Berlin Heidelberg, 2001. 89-103.*

Curbera, Francisco, et al. "Unraveling the Web services web: an introduction to SOAP, WSDL, and UDDI." Internet Computing, IEEE 6.2 (2002): 86-93.*

Tai, Stefan, et al. "Conditional Messaging: Extending Reliable Messaging with Application Conditions." Distributed Computing Systems, 2002. Proceedings. 22nd International Conference on. IEEE, 2002.*

Tai, Stefan, Thomas A. Mikalsen, and Isabelle Rouvellou. "Using message-oriented middleware for reliable web services messaging." Web Services, E-Business, and the Semantic Web. Springer Berlin Heidelberg, 2004. 89-104.*

IBM, et al. Reliable Message Delivery in a Web Services World: A Proposed Architecture and Roadmap, A Joint White Paper from IBM Corporation and Microsoft Corporation, Mar. 13, 2003.*

Mukhi, N. , Khalaf, R. , Fremantle, P. , Multi-protocol Web Services for enterprises and the Grid, Euroweb 2002, Dec. 17, 2002.*

Richard Cross & Ahmed Nassef. (Nov. 1999). Service with a :). Direct Marketing, 62(7), 16-18.

Ian Rubin & Timothy Cook. (Nov. 1999). E-mail in your future. Independent Banker, 49(11), 24-35.

* cited by examiner

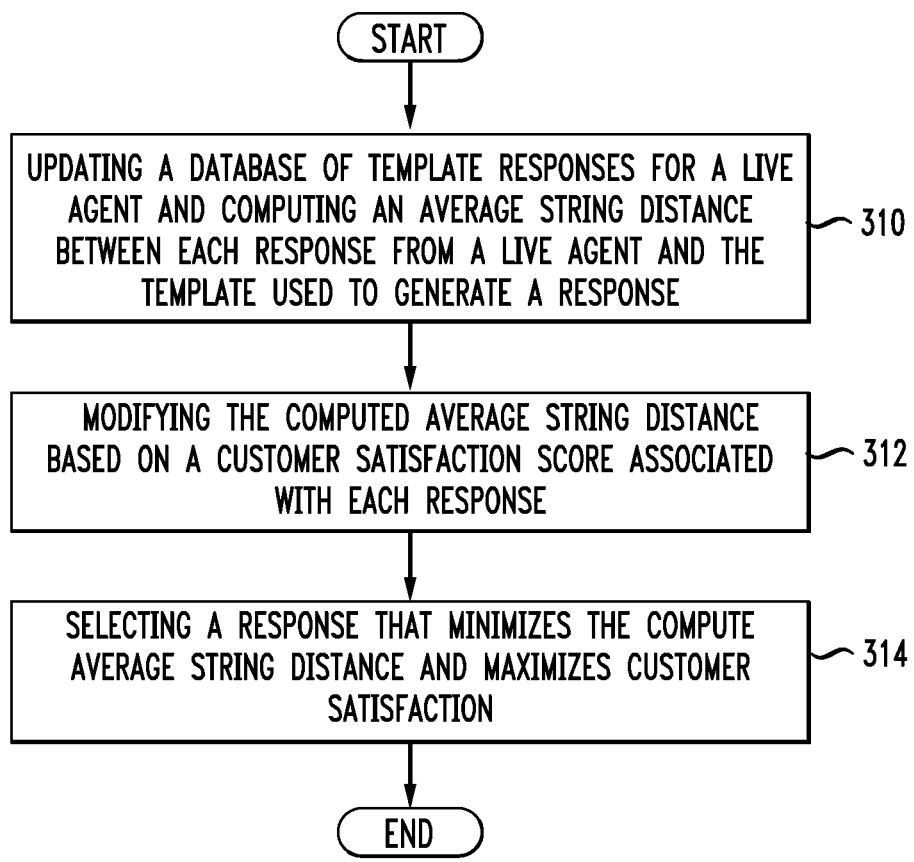

SYSTEM AND METHOD FOR OPTIMIZING RESPONSE HANDLING TIME AND CUSTOMER SATISFACTION SCORES

PRIORITY INFORMATION

The present application is a continuation of U.S. patent application Ser. No. 13/539,896, filed Jul. 2, 2012 which is a continuation of U.S. patent application Ser. No. 12/019,821, filed Jan. 25, 2008, now U.S. Pat. No. 8,214,441, the contents of which is incorporated herein by reference in its entirety.

BACKGROUND OF THE INVENTION

1. Field of the Invention

The present invention relates to email interactions and more specifically to a system and method of providing an improved template database for live agents responding to queries.

2. Introduction

Email and text channels are playing an ever increasing role in customer care. For example, many businesses will utilize a combination of automated responses and live customer agent responses to allow customer agents to respond to received communications from users. Typically, these communications are email, but voice and other communications may also receive responses from entities using automated approaches or live agents. Unlike the speech based customer care, email or other channels offer advantages of being asynchronous so that the load on any particular customer service agent can be balanced, dynamically resulting in cost savings. The success of an email customer care operation can be measured by two factors: average handling time and customer satisfaction scores. The average handling time measures the average amount of time spent by an agent answering an email. This metric correlates with the cost of operations. The second metric tracks the customer satisfaction and evaluates on a scale on how satisfied the customer is based on the interaction.

The objection is to drive the customer satisfaction score higher and lower the average handling time.

Typically, a live agent when responding to a user query will access a database of template responses and wherein each appropriate template addresses the incoming customer email and may be chosen by the agent. The agent then customizes the template to the particulars of the incoming email. The selection of the template and the amount of customization done to it directly impacts the customer satisfaction score and the average handling time. In other words, the more customized an email, the higher the customer satisfaction score and the longer the average handling time. What is needed in the art is a method and system for improving the customer satisfaction score while lowering or maintaining a low average handling time.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present disclosure addresses the above-identified problem of selecting a response that minimizes the average handling time and simultaneously maximizes the customer satisfaction scores. Disclosed are systems, methods and computer-readable media for accomplishing this task. On aspect of the invention relates to a method of updating a database of template responses utilized by a live agent. The method includes computing an average string distance between each response from a live agent and a template used to generate the response, modifying the computed average string difference based on a customer satisfaction score associated with each response and selecting a response that minimizes the computed average string distance and maximizes customer satisfaction.

Another method embodiment of the invention relates to a method of managing email responses by live agents. The method includes calculating a prototype response or centroid based on a history of live agents responding to received communications on a certain issue, using a database of templates, handling time for the live agent to generate the response, and customer satisfaction data associated with the responses. The method further includes adding the prototype response to the database of templates and upon receiving a further communication on a certain issue, presenting the prototype response to the live agent for use in generating a response to the further communication. By the approaches disclosed herein, improved templates may be presented to live agents which require less customization and which will therefore reduce the average handling time and increase customer satisfaction.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3B illustrates yet another method embodiment of the present invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
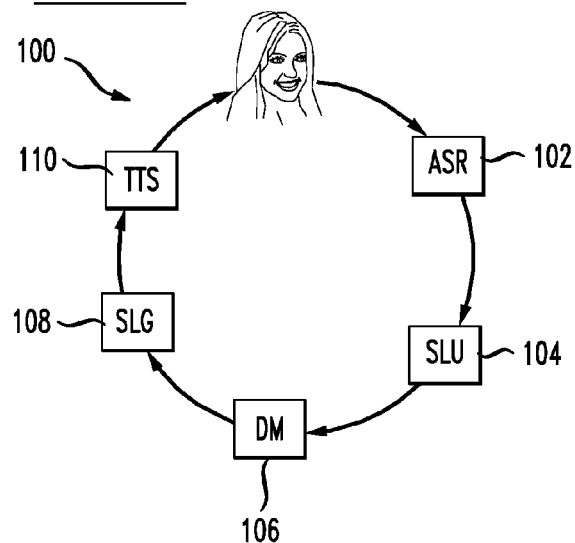
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
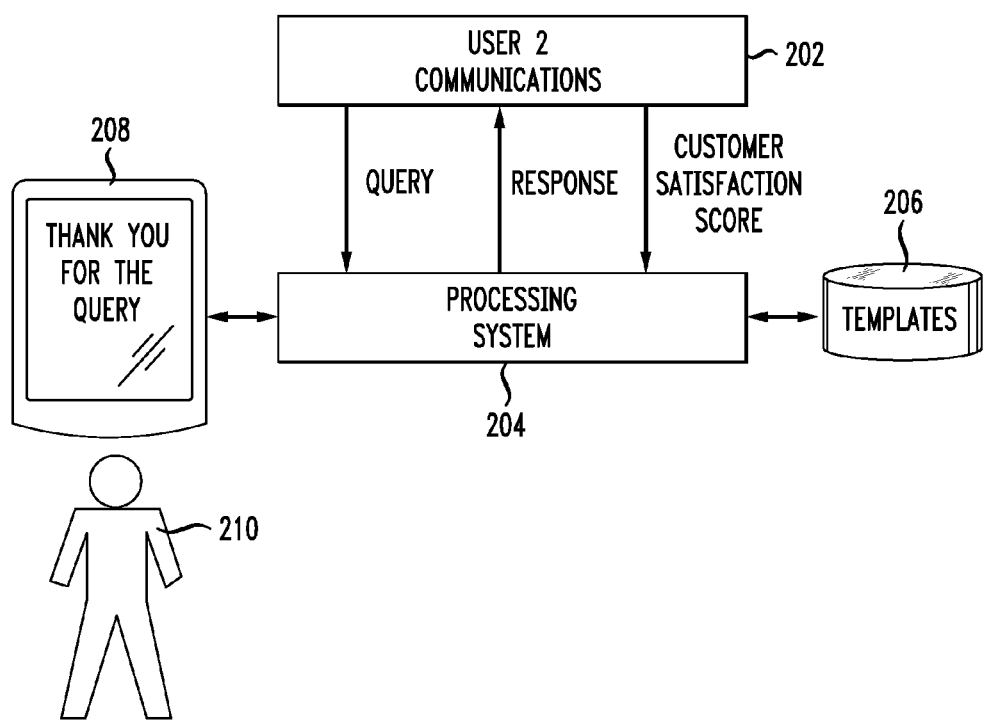
FIG. 2 illustrates basic components associated with an embodiment of the present invention.

FIG. 2 illustrates an example system 200 associated with the present disclosure. User communication 202 refers to any input communication from the user and is typically an email. User communication may be a query which is submitted to processing system 204 over a network such as the internet or a wireless network in a manner known to those of skill in the art. Processing system 204 will communicate with a templates database 206 and a computing device 208 to which a customer care agent 210 interacts. As has been introduced above, in a typical scenario, customer agent 210 will receive the user communication 202 and on a computing device 208 receive a particular template from templates database 206 that may be used for responding to the query 202. Because the query may have particular questions not specifically addressed by the template, the agent 210 may modify the response by adding or deleting words, or moving words around, adding text and so forth. The responses communicated from the processing system to the user, at which point a user typically provides a customer satisfaction score which quantifies the customer's experience.

Figure 3A:
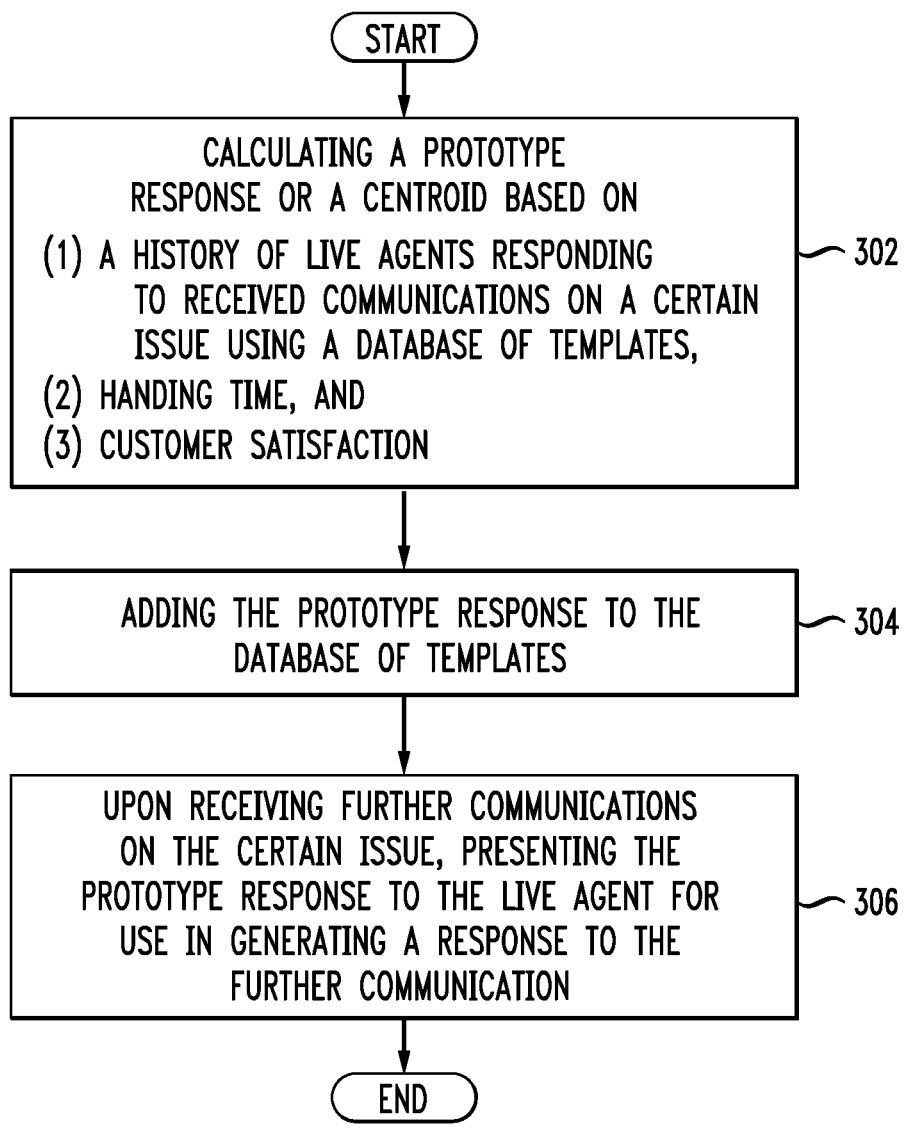
FIG. 3A illustrates a method embodiment of the invention.

FIG. 3A illustrates a method of managing email responses by a live agent and in connection with FIG. 2, FIG. 3A illustrates a method including calculating a prototype response or a centroid based on (1) a history of live agents responding to received communications on a certain issue using a database of templates, (2) handing time, and (3) customer satisfaction (302), adding the prototype response to the database of templates (304) and, upon receiving further communications on the certain issue, presenting the prototype response to the live agent for use in generating a response to the further communication (306). Adding the prototype response to the database of templates may further include manually reviewing the modifying the prototype response template. For example, after the system calculates various prototype responses based on user generated responses, an optimal part in that response on a certain issue such as receiving account balance, technical questions such as how to reset your modem, and so forth may be ranked so that the best prototype response may be identified and templatized. Calculated in the prototype response may include determining an extent of modification between the selected template by live agent and the response that is sent from the live agent to the user. The extended modification may be based on a string edit distance which involves a measure of at least one of substitutions, deletions, and insertions of words into the template to generate the actual response that is transmitted to the user.

FIG. 3B illustrates another method embodiment of updating a database of template responses for a live agent. The method includes computing an average string distance between each response from a live agent and the template used to generate a response (310), modifying the computed average string distance based on a customer satisfaction score associated with each response (312) and selecting a response that minimizes the compute average string distance and maximizes customer satisfaction (314). Modifying the computed average string difference may involve decreasing the computing average sting distance based on particular characteristics of the customer satisfaction score.

Using the principles disclosed herein, the average handling time of an agent will be reduced because the template responses will be improved based on previous history and previous responses developed by agents. In one aspect, each response that is modified from a template will be analyzed and processed to compute a parameter that may be associated with the average string distance between each response and the template used to generate the response. For example, in one particular area, such as a user requesting a new password, there may be three templates in the database but ten different responses generated by various agents. Each of these responses may be processed such that one or more optimal prototype responses may be identified. The prototype responses may be generated based on a combination of calculation of average string distance and modification of that value based on customer satisfaction. Furthermore, in another aspect, the prototype response would represent an average of all the responses that were sent out in the past and based on some of the calculations of string at a distance and customer satisfaction. In this regard, rather than ranking various prototype responses as a single prototype response would be generated and modified over time as more responses on a particular issue, where they are generated from particular templates, are sent by agents.

One aspect of the invention relates to generating and improving a prototype response until a certain threshold is met. For example, the threshold may be after 20 responses have been generated or 20 responses that each individually meet a certain threshold such that the prototype response that is added to the template database may have a sufficient confidence that it will reduce average handling time and increase customer satisfaction more than templates that currently exist in the database. Another variation of this approach involves using responses from the past and clustering them to find a new prototype which would replace the previous templates that were used. A variant of this approach is to constrain the search for the prototype by looking in the templates that are not useless in the database and constrain them so that there are prototypes which may be developed which may be far away from the current prototypes or current templates but a completely new template is needed. For example, rather than replacing templates in the database the system may add a template to the database so that they can still do an improved job inasmuch as the existing templates may handle 80% of the inquiries at a satisfactory level but 20% of the inquiries may be for subject matter that is fairly distant from the current set of templates. In this example, the system would seek to develop a completely new template for such a matter that is not be adequately handled by current templates and thus the analysis slightly differs from the analysis above. The system, in the analysis of the responses, show that agents are trending toward adding a particular piece of data or a similar type of response that is not addressed by the current template set. This may be because of a lack of subject matter in the templates to handle the 20% of the data that is distant from the existing template database.

In one aspect, systems may pre-populate templates with data such as name, account number, email address, telephone number and so on. In order to properly tailor a prototype response for adding to the template database, an aspect of this disclosure may relate to whether during the process or the conclusion of identifying a prototype response for adding to a template database, performing an additional analysis which involves testing the template for its consistency and convenience in being pre-populated with various pieces of data. For example, there may be certain places within the template which would receive pre-populated data but inasmuch as the prototype response is generated based on other responses from agents, there may be further changes that should be made from the view point of readability, clarity and so forth when pre-populated data is inserted. Furthermore, in some cases, inquiries may not be categorized or classified into one particular area. For example, a user may email and want an account balance and to reset a password. Where two different categories may be proposed, the agent may cobble together two templates and remove commonalities and then generate a single response. In this regard, statistical analysis may further show a common request for information of several different types in which case a system would naturally generate an approved prototype response which can go into the template database under several categories and be retrieved and be presented as an option for an agent in the appropriate circumstances.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   organizing a plurality of template email responses by assigning to each template email response a subject area; and
   when a specific subject area has no associated template email responses:
   generating, via a processor, a prototype email response for a topic using a combination of:
   (1) text from previous email responses associated with the specific subject area;
   (2) handling times associated with the previous email responses;
   (3) string distances between the previous email responses; and
   (4) customer satisfaction data associated with the previous email responses;
   receiving a communication related to the specific subject area; and
   presenting the prototype email response to a live agent for consideration in responding to the communication.

2. The method of claim 1, wherein the previous email responses are from a plurality of live agents.

3. The method of claim 1, wherein generating the prototype email response, prior to receiving the communication related to the specific subject area, comprises:
   (5) performing populating consistency and convenience test on the prototype email response.

4. The method of claim 1, wherein each template email response is assigned to multiple subject areas.

5. The method of claim 1, wherein the string distances are averaged.

6. The method of claim 1, wherein generating the prototype email response further comprises reducing the string distances while increasing an importance of the customer satisfaction data.

7. The method of claim 1, further comprising ranking the plurality of template email responses based on one of the handling times and the customer satisfaction data.

8. A system comprising:
   a processor; and
   a computer-readable storage medium having instructions stored which, when executed by the processor, cause the processor to perform operations comprising:
   organizing a plurality of template email responses by assigning to each template email response a subject area; and
   when a specific subject area has no associated template email responses:
   generating, via a processor, a prototype email response for a topic using a combination of:
   (1) text from previous email responses associated with the specific subject area;
   (2) handling times associated with the previous email responses;
   (3) string distances between the previous email responses; and
   (4) customer satisfaction data associated with the previous email responses;
   receiving a communication related to the specific subject area; and
   presenting the prototype email response to a live agent for consideration in responding to the communication.

9. The system of claim 8, wherein the previous email responses are from a plurality of live agents.

10. The system of claim 8, wherein generating the prototype email response, prior to receiving the communication related to the specific subject area, comprises:
    (5) performing populating consistency and convenience test on the prototype email response.

11. The system of claim 8, wherein each template email response is assigned to multiple subject areas.

12. The system of claim 8, wherein the string distances are averaged.

13. The system of claim 8, wherein generating the prototype email response further comprises reducing the string distances while increasing an importance of the customer satisfaction data.

14. The system of claim 8, the computer-readable storage medium having additional instructions stored which result in the operations further comprising ranking the plurality of template email responses based on one of the handling times and the customer satisfaction data.

15. A computer-readable storage device having instructions stored which, when executed by a computing device, cause the computing device to perform operations comprising:
    organizing a plurality of template email responses by assigning to each template email response a subject area; and
    when a specific subject area has no associated template email responses:
    generating, via a processor, a prototype email response for a topic using a combination of:
    (1) text from previous email responses associated with the specific subject area;
    (2) handling times associated with the previous email responses;
    (3) string distances between the previous email responses; and
    (4) customer satisfaction data associated with the previous email responses;
    receiving a communication related to the specific subject area; and
    presenting the prototype email response to a live agent for consideration in responding to the communication.

16. The computer-readable storage device of claim 15, wherein the previous email responses are from a plurality of live agents.

17. The computer-readable storage device of claim 15, wherein generating the prototype email response, prior to receiving the communication related to the specific subject area, comprises:
    (5) performing populating consistency and convenience test on the prototype email response.

18. The computer-readable storage device of claim 15, wherein each template email response is assigned to multiple subject areas.

19. The computer-readable storage device of claim 15, wherein the string distances are averaged.

20. The computer-readable storage device of claim 15, wherein generating the prototype email response further comprises reducing the string distances while increasing an importance of the customer satisfaction data.

* * * * *